United States Patent
Chen et al.

(10) Patent No.: US 10,122,943 B1
(45) Date of Patent: Nov. 6, 2018

(54) HIGH DYNAMIC RANGE SENSOR RESOLUTION USING MULTIPLE IMAGE SENSORS

(71) Applicant: Motorola Mobility LLC, Chicago, IL (US)

(72) Inventors: YinHu Chen, Deerfield, IL (US); Daniel Maack Bloom, Loveland, CO (US); Susan Yanqing Xu, Westmont, IL (US); Valeriy Marchevsky, Glenview, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

(21) Appl. No.: 15/588,437

(22) Filed: May 5, 2017

(51) Int. Cl.
| H04N 5/235 | (2006.01) |
| H04N 5/265 | (2006.01) |
| H04N 5/04  | (2006.01) |

(52) U.S. Cl.
CPC ............... *H04N 5/265* (2013.01); *H04N 5/04* (2013.01); *H04N 5/2351* (2013.01)

(58) Field of Classification Search
CPC ................................................. H04N 5/35563
USPC .............................................. 348/221.1, 362
See application file for complete search history.

(56) References Cited

U.S. PATENT DOCUMENTS

| 9,167,167 | B2 * | 10/2015 | Davidovici | ............ H04N 3/155 |
| 2008/0094486 | A1 | 4/2008 | Fuh et al. | |
| 2012/0002082 | A1 | 1/2012 | Johnson et al. | |
| 2012/0062694 | A1 | 3/2012 | Muramatsu | |
| 2013/0242057 | A1 | 9/2013 | Hong et al. | |
| 2015/0092066 | A1 | 4/2015 | Geiss et al. | |
| 2016/0301840 | A1 | 10/2016 | Du et al. | |
| 2017/0163902 | A1 | 6/2017 | Wu | |
| 2017/0201684 | A1 | 7/2017 | Kang et al. | |
| 2017/0324906 | A1 | 11/2017 | Kang et al. | |

(Continued)

FOREIGN PATENT DOCUMENTS

| EP | 2563010 | 2/2013 |
| EP | 3062509 | 8/2016 |

OTHER PUBLICATIONS

"Non-Final Office Action", U.S. Appl. No. 15/354,501, dated Mar. 15, 2018, 11 pages.

(Continued)

*Primary Examiner* — Anthony J Daniels
(74) *Attorney, Agent, or Firm* — Wolfe-SBMC (57) ABSTRACT

Various embodiments provide improved image resolution using a High Dynamic Range (HDR) image sensor. A computing device calculates long exposure settings and short exposure settings for image sensors of a computing device. The long exposure settings and the short exposure settings are applied to a first image sensor of the image sensors, and only the short exposure settings are applied to a second image sensor of the image sensors. Some embodiments use an interleaved High Dynamic Range (iHDR) image sensor as the first image sensor, and a Clear or Mono image sensor for the second image sensor. Various embodiments generate a synchronized image that includes a first image generated by the first image sensor and a second image generated by the second image sensor. Upon receiving the synchronized image, some embodiments fuse the first image and the second image to improve the image resolution of the first image capture.

20 Claims, 9 Drawing Sheets

(56) References Cited

U.S. PATENT DOCUMENTS

| | | |
|---|---|---|
| 2018/0013945 A1* | 1/2018 | Ciurea .............. H04N 5/35563 |
| 2018/0024330 A1* | 1/2018 | Laroia ................ H04N 5/2258 |
| 2018/0139367 A1 | 5/2018 | Chen et al. |

OTHER PUBLICATIONS

Chen,"Backlit Face Detection", U.S. Appl. No. 15/353,435, filed Nov. 16, 2016, 44 pages.

Chen,"Exposure Metering Based on Depth Map", U.S. Appl. No. 15/441,085, filed Feb. 23, 2017, 47 pages.

Li,"Deblurring an Image", U.S. Appl. No. 15/013,232, filed Feb. 2, 2016, 47 pages.

Musatenko,"Bayer-Clear Image Fusion for Dual Camera", U.S. Appl. No. 15/349,948, filed Nov. 11, 2016, 42 pages.

"Combined Search and Examination Report", GB Application No. 1718381.5, dated May 23, 2018, 7 pages.

\* cited by examiner

HIGH DYNAMIC RANGE SENSOR RESOLUTION USING MULTIPLE IMAGE SENSORS

BACKGROUND

Digital cameras capture a real-world scene in a static image by exposing image sensors to light. In turn, the image sensors translate the scene into a digital representation based information gathered from the light. Unfortunately, digital representations have inherent inaccuracies. To improve upon these inaccuracies, the smaller discrete sensors included in the image sensor can be carefully arranged to improve various properties of the image impacted by the inaccuracies. However, the improvement of one image property oftentimes introduces another inaccuracy or degradation in another image property. For example, some image sensors arrange the discrete sensors in a pre-determined pattern to improve the dynamic range of luminosity an image capture. While such an arrangement improves the dynamic range of the image, it adversely affects resolution or clarity in the image capture. Thus, it is desirable to provide a way to improve a property of a digital image, such as its dynamic range, without degrading another property, such as its resolution.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Various embodiments provide improved image resolution using a High Dynamic Range (HDR) image sensor. A computing device calculates long exposure settings and short exposure settings for image sensors of a computing device. The long exposure settings and the short exposure settings are applied to a first image sensor of the image sensors, and only the short exposure settings are applied to a second image sensor of the image sensors. Some embodiments use an interleaved High Dynamic Range (iHDR) image sensor as the first image sensor, and a Clear or Mono image sensor for the second image sensor. Various embodiments generate a synchronized image that includes a first image generated by the first image sensor and a second image generated by the second image sensor. Upon receiving the synchronized image, some embodiments fuse the first image and the second image to improve the image resolution of the first image capture.

Consider now an example environment in which various aspects as described herein can be employed.

Example Environment

Figure 1:
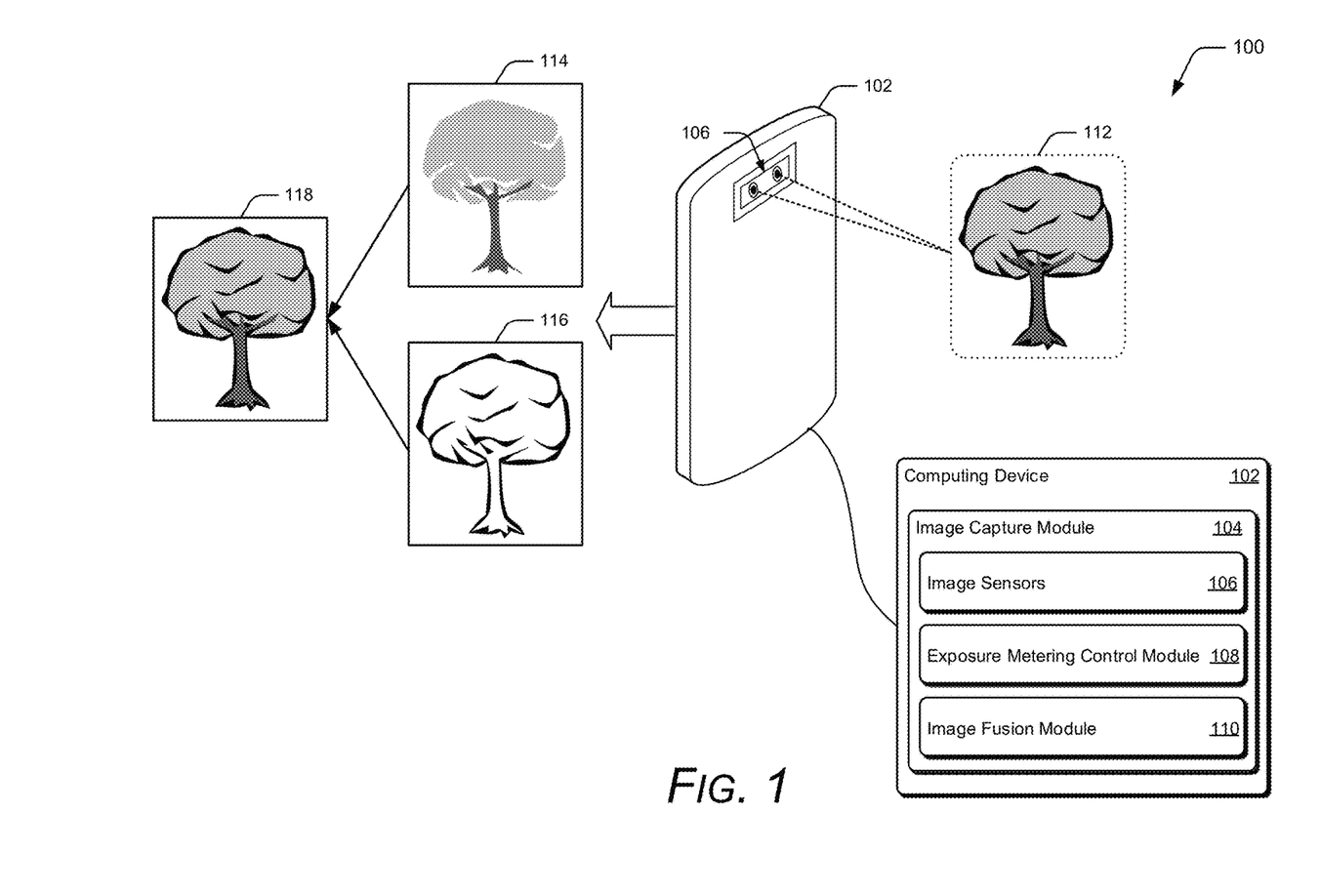
FIG. 1 is an overview of a representative environment that includes an example implementation in accordance with one or more embodiments.

FIG. 1 illustrates an example operating environment 100 in accordance with one or more embodiments. Environment 100 includes computing device 102 in the form of a mobile phone. However, it is to be appreciated that computing device 102 can be any other suitable type of computing device without departing from the scope of the claimed subject matter. Among other things, a user can interact with computing device 102 to capture digital images and/or video of various scenes. In this example, computing device 102 includes an image capture module 104, which represents a device that provides improved image resolution using an HDR image sensor as further described herein. For discussion purposes, image capture module 104 is illustrated as a single module, but it is to be appreciated that image capture module 104 can be implemented using any suitable combination of hardware, software, and/or firmware.

Image capture module 104 includes image sensors 106 that work in concert to generate a digital image. For example, image sensors 106 include two synchronized image sensors that capture respective images. These image sensors can be the same type of image sensor, where each image sensor captures a same set of information, or can be different types of image sensors, where each respective image sensor is designed to capture different information, such as color image information, clear or shading image information, raw image data, and so forth. In some embodiments, a first (main) image sensor is configured as an HDR image sensor, and a second (auxiliary) image sensor is configured as a Clear or a Mono image sensor. However, other types of image sensors can be used. Due to relative positioning, the image sensors each capture a respective image of a scene, but from a different perspective. Images can be stored in various color spaces and representations, such as Red-Green-Blue (RGB), standard Red-Green-Blue (sRGB), Luminance-Blue-Luminance-Red-Luminance (YUV), a color-opponent space with Lightness and color-opponent dimensions (CIE L*a*b), and so forth. These images can also be stored or expressed in any suitable format, such as Joint Photographic Experts Group (JPEG), Tagged Image File Format (TIFF), Graphics Interchange Format (GIF), bitmap (BMP), Portable Network Graphics (PNG), High-Dynamic-Range Imaging (HDRI), and so forth. The image sensors can have various resolutions and can be of any suitable types as further described herein. Here, the term "image sensor" generally describes a sensor that is used to capture a corresponding image, and can be a single sensor, or include multiple smaller discrete sensors that work together to generate a single image.

Image capture module 104 also includes an exposure metering control module 108 and an image fusion module 110. Exposure metering control module 108 represents functionality that calculates exposure settings used by image sensors 106 and/or image capture module 104, such as exposure time settings and/or luminance gain settings. This can include calculating long exposure settings for a first set of discrete sensors in an image sensor and short exposure settings for a second set of discrete sensors in an image sensor. While illustrated as a separate module from image sensors 106, exposure metering control module 108 can sometimes be partially or fully implemented within, and/or draw input information from, the image sensors to calculate the various exposure settings. Here, the phrase "long exposure settings" corresponds to exposure gain and time settings that set longer exposure gain and time settings of discrete sensors relative to the "short exposure settings". In other words, long exposure settings generally relate to configuring the discrete sensors settings to better capture low-light environments relative to bright-light environments. Conversely, "short exposure settings" generally relate to exposure gain and time settings configured to better capture bright-light environments relative to low-light environments. In some embodiments, exposure metering control module 108 also applies the long exposure settings and short exposure settings to image sensors 106. This can include using different settings for different image sensors, such as applying both the long exposure settings and the short exposure settings to a first image sensor, and only the short exposure settings to a second image sensor.

Image fusion module 110 represents functionality that generates an output digital image by fusing together synchronized images captured by image sensors 106. For instance, image fusion module 110 sometimes fuses the respective digital images received from image sensors 106 to generate an image with improved resolution. The fusion process can either merge all information from each respective digital image or selectively fuse different portions of the digital images together. Some embodiments select which portions to fuse based upon a corresponding luminance or brightness of the received information. This can include using only portions generated by the first image sensor for some regions of the output digital image, using only portions generated by the second image sensor for other regions of the output digital image, blending or fusing together portions generated by both image sensors for additional regions of the output digital image, weighting how much information to fuse based upon luminance, or any combination thereof.

Scene 112 of environment 100 generally represents any suitable viewpoint or object that an image capture module can visually capture. In this example, each respective image sensor of image sensors 106 captures a respective image that relates to scene 112 such that a first image sensor captures digital image 114 and a second image sensor captures digital image 116. As further described herein, digital image 114 and digital image 116 can sometimes capture different types of information about scene 112, where an HDR image sensor generates digital image 114 and a Clear or Mono image sensor captures digital image 116. It is to be appreciated that any other suitable type of image sensor can be utilized to generate digital image 114 and/or digital image 116 without departing from the scope of the claimed subject matter. In some embodiments, exposure metering control module 108 calculates and applies the exposure settings used by image sensors 106 to generate digital image 114 and/or digital image 116. In turn, image fusion module 110 receives digital image 114 and digital image 116 as input that is subsequently used to generate a (fused) output image and/or a preview image. As further described herein, image fusion module 110 uses information from selective portions of digital image 116 and/or digital image 114 to generate output digital image 118. Accordingly, output digital image 118 represents a digital image generated by image fusion module 110 by fusing together information from multiple digital images.

Figure 2:
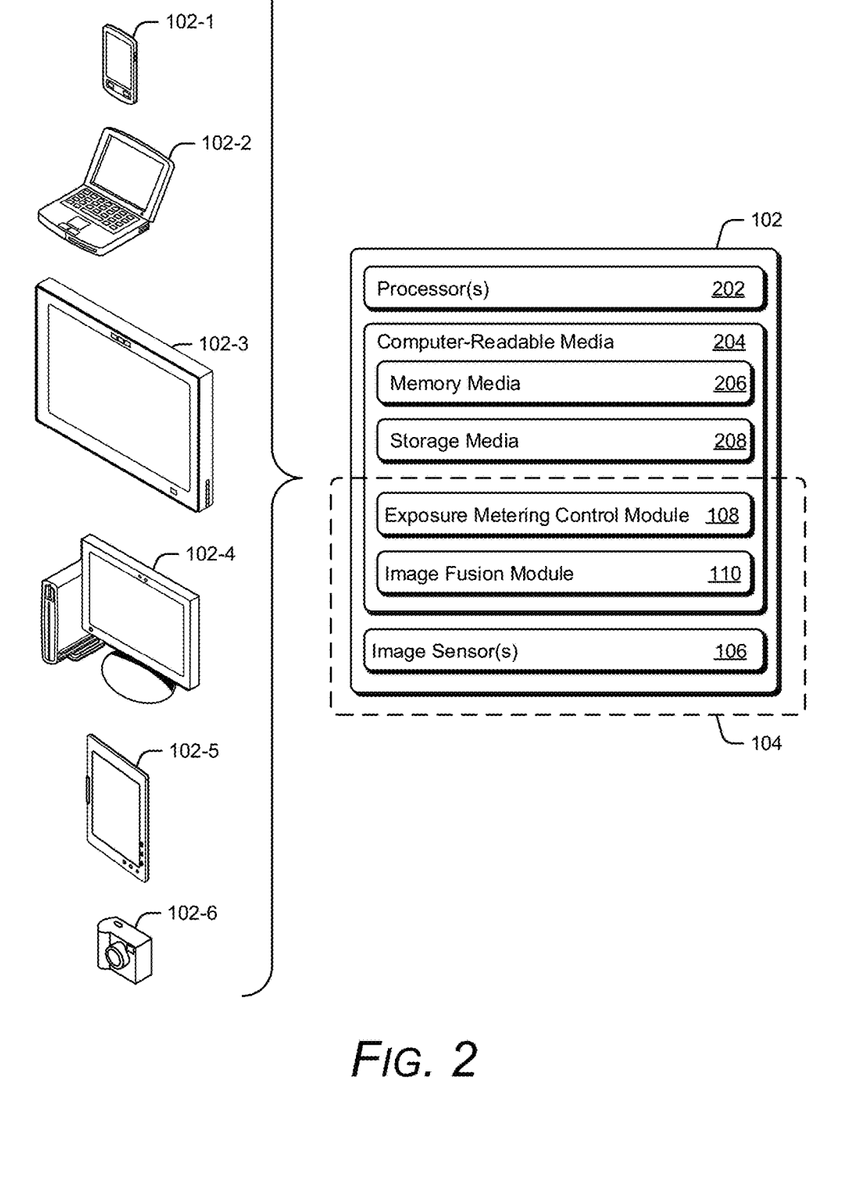
FIG. 2 illustrates a more detailed view of an example implementation included in FIG. 1 in accordance with one or more embodiments.

Nom FIG. 2 illustrates an expanded view of computing device 102 of FIG. 1 with various non-limiting example devices including: smartphone 102-1, laptop 102-2, television 102-3, desktop 102-4, tablet 102-5, and camera 102-6. Accordingly, computing device 102 is representative of any suitable device that incorporates improved image resolution via an HDR image capture by way of image capture module 104. Computing device 102 includes processor(s) 202 and computer-readable media 204, which includes memory media 206 and storage media 208. Applications and/or an operating system (not shown) embodied as computer-readable instructions on computer-readable media 204 can be executed by processor(s) 202 to provide some or all of the functionalities described herein. To facilitate image capture, computing device 102 includes image capture module 104. Here, image capture module 104 stores exposure metering control module 108 and image fusion module 110 on computer-readable media 204. However, while exposure metering control module 108 and image fusion module 110 are illustrated here as residing on computer-readable media 204, they each can alternately or additionally be implemented using hardware, firmware, or any combination thereof. Image capture module 104 also includes image sensors 106, which can be one or multiple image capture mechanisms.

Having described an example operating environment in which various embodiments can be utilized, consider now a discussion of digital image captures in accordance with one or more embodiments.

Digital Image Captures

Image capture mechanisms preserve an image based upon their exposure to light. An analog camera exposes a filmstrip as a way to detect or capture light. Light alters the filmstrip and, in turn, the image can be recovered by chemically processing the filmstrip. In an analog image capture, the filmstrip stores a continuous representation of the light (and corresponding scene). Digital image sensors, too, are exposed to light to capture information. However, instead of an analog representation, digital image sensors generate and store discrete representations of the image.

Figure 3:
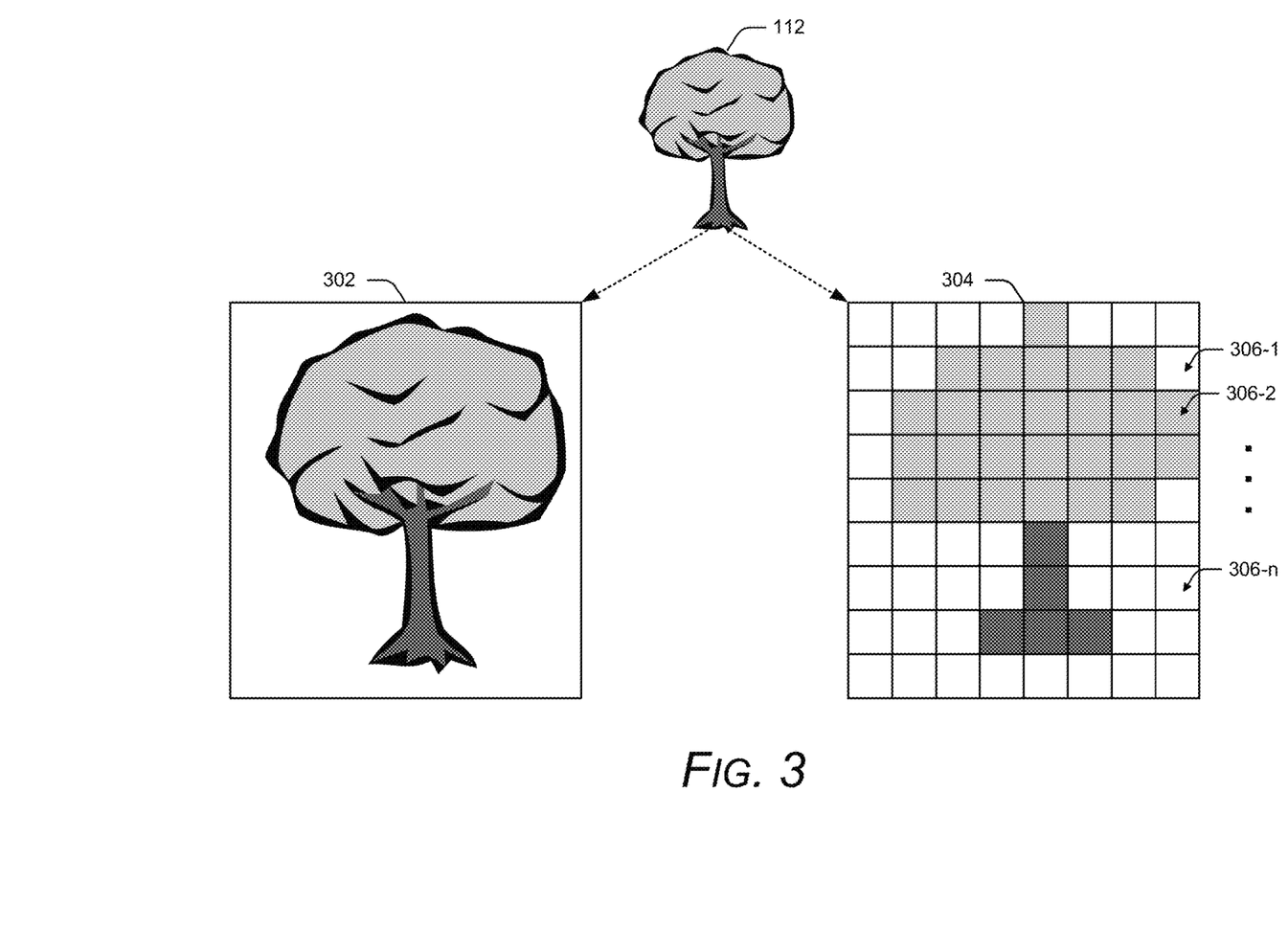
FIG. 3 illustrates an example of digitally capturing scene in accordance with one or more embodiments.

Consider FIG. 3 in which alternate image capture mechanisms are employed to capture scene 112 of FIG. 1. Image 302 illustrates an analog capture of scene 112 performed through the use of analog techniques, such as film capture. Here, the image has been captured in a continuous nature. Conversely, image 304 illustrates a digital capture of scene 112. Instead of capturing the image continuously, image 304 represents sectors of scene 112 in discrete components, alternately known as a "pixel". Each discrete component has a value associated with it to describe a corresponding portion of the image being captured. For example, discrete component 306-1 represents a region of scene 112 in which the tree is not present, discrete component 306-2 represents a region of scene 112 in which a portion of the tree is present, and so forth. Accordingly, image 304 digitally represents scene 112 by partitioning the image into "n" discrete components (where "n" is an arbitrary value), and assigning a value to each component that is uniform across the whole component. Thus, discrete component 306-1 has a first value, discrete component 306-2 has a second value, and so forth all the way to discrete component 306-*n*. Here, the term "value" is generally used to indicate any representation that can be used to describe an image. In some cases, the value may be a single number that represents an intensity or brightness of a corresponding light wave that is being captured. In other cases, the value may be a combination of numbers or vectors that correspond to various color combinations and/or intensities associated with each color.

The size of a discrete component within a digital image, as well as the number of discrete components and the information stored in the discrete component, affects a corresponding resolution of the image. For example, image 304 is illustrated as having 8×9 (width vs. height)=72 discrete components. However, relative to the analog capture represented in image 302, it can be seen that there are inaccuracies in the digital image capture. Given the size of each discrete component, and the uniform nature across the whole of the discrete component, the resultant image lacks details that can be found either in image 302 or original scene 112. By increasing the number of components, reducing the size of the components, and/or using the information more efficiently within the components, the resultant digital image can more accurately capture details and add resolution to the image to more closely resemble the analog version and/or the original captured image. A pixel refers to a singular discrete component of a digital image capture that is the smallest addressable element in the image. Thus, each pixel has a corresponding address and value.

Figure 4:
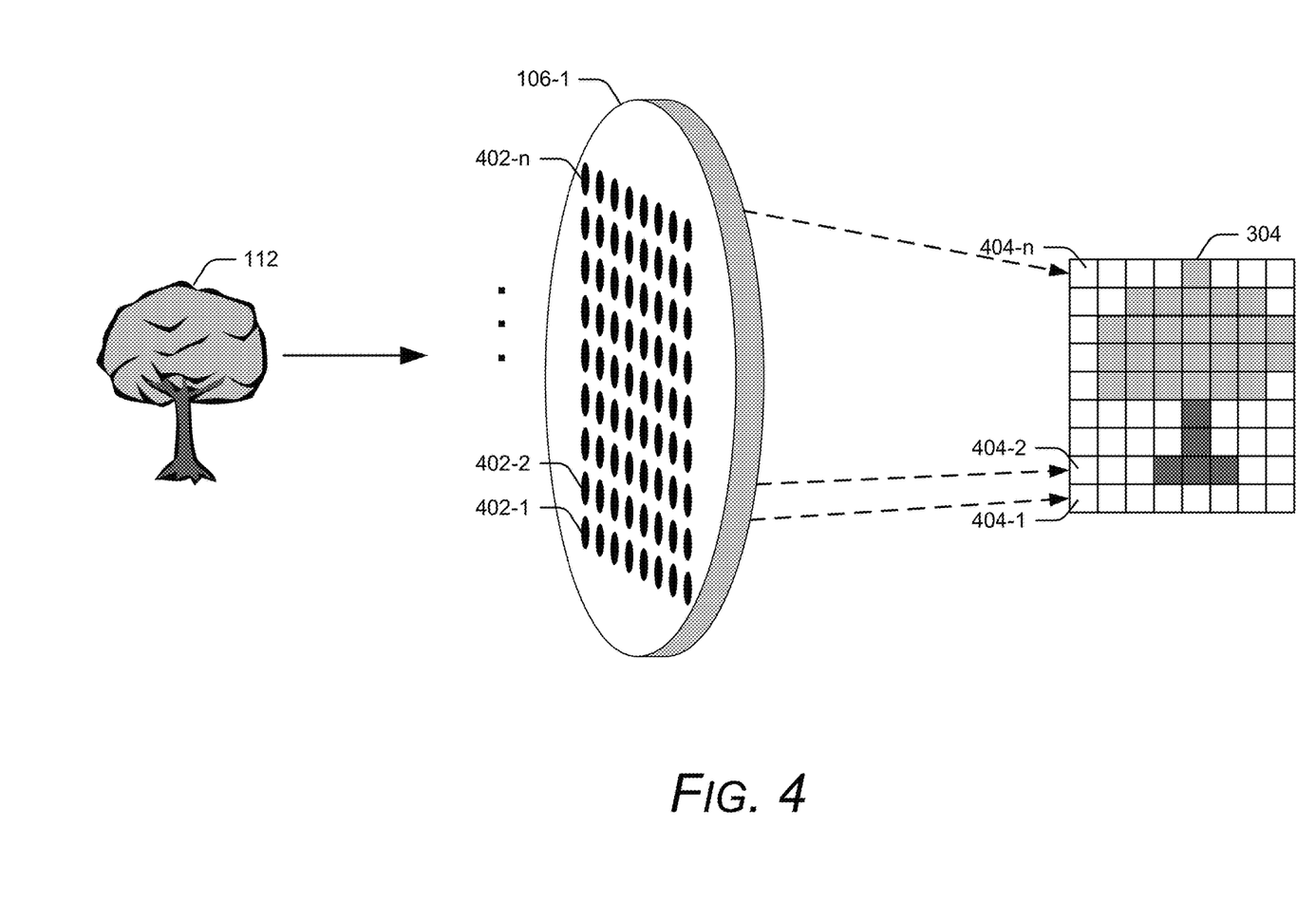
FIG. 4 illustrates an example of a digital image sensor in accordance with one or more embodiments.

A singular image sensor, such as one of the image sensors in image sensors 106 of FIG. 1, can consist of several smaller sensors. Consider FIG. 4 that includes an example image sensor 106-1, which is a single image sensor of image sensors 106 of FIG. 1, scene 112 from FIG. 1, and image 304 from FIG. 3. As can be seen, image sensor 106-1 includes multiple smaller sensors, labeled as sensor 402-1 through sensor 402-*n*, where n is an arbitrary number. For simplification, these sensors will be generally referred to as sensors 402 when discussed collectively. While this example illustrates image sensor 106-1 as having 72 small sensors, an image sensor can have any suitable number of sensors. Each sensor of sensors 402 can relate to a grid of colors (e.g., red, blue, or green), a grid of luminance, a single pixel, multiple pixels, or any combination thereof. For example, sensor 402-1 corresponds to data captured to generate pixel 404-1, sensor 402-2 corresponds to data captured to generate pixel 404-2, and sensor 402-*n* corresponds to data captured to generate pixel 404-*n*. While illustrated as a single entity, it is to be appreciated that sensors 402 can each be considered a sensor unit, in which the unit includes multiple sensors with varying functionality. Through careful selection and arrangement, the different smaller (color) sensors can improve the resultant image capture. A Bayer array (alternately referred to here as a Bayer filter or Bayer grid) is one particular arrangement where 50% of the sensors are associated with green, 25% are associated with red, and 25% are associated with blue. In other words, a general RGB image sensor used to capture an image may utilize multiple smaller green image sensors, multiple smaller blue image sensors, and multiple smaller red image sensors to make up the overall general RGB image sensor. These smaller sensors capture characteristics about the incoming light with respect to colors, as well as intensity. In turn, the values stored for each discrete representation of an image captured using Bayer filter techniques each express the captured color characteristics. Thus, image 304 has multiple discrete components that each correspond to a respective value (or values) that represent as a Bayer image capture. While the above discussion refers to RGB, it is to be appreciated that other color combinations and/or configurations can be used without departing from the scope of the claimed subject matter. For instance, an HDR image sensor alternates how exposure times are set for each discrete sensor, such as alternating between long exposure times for a first grouping of discrete sensors, short exposure times for a second grouping of discrete sensors, etc. In turn, an image generated via the HDR image sensor gains dynamic range in terms of luminosity.

As another example, consider a Clear or Mono image sensor. Luminosity refers to brightness or intensity related to a captured image. For instance, an image or pixel with little to no brightness (e.g., dark or black) would have generally 0% luminance or brightness, while an image or pixel that has a large amount of light has generally 100% luminance (e.g., bright or white). Depending upon the brightness or intensity, luma information over an image can vary over a range of 0%-100% and therefore captures light intensity. Thus, in a general sense, a Clear or Mono image sensor tracks light intensity instead of color information. This monochrome aspect improves signal-to-noise ratio in low-light situations and enables a high detail for a given pixel count, though in monochrome (e.g., greyscale).

These examples are for discussion purposes, and are not intended to be limiting. Further, it is to be appreciated that the discussion of digital image capture and image sensors has been simplified, and is not intended to describe all their technical aspects. Having described various principles associated with digital image capture, now consider a discussion of improved resolution using an HDR image sensor.

Improved Resolution of an HDR Image Using Multiple Sensors

Digital photography enables a user to easily and inexpensively capture multiple pictures relative to analog photography. For example, many mobile devices incorporate digital image sensors instead of analog cameras due to the smaller size and cost of the digital cameras. While consumers appreciate the addition of cameras in various types of computing devices, it is not uncommon for the consumers to demand less expensive and smaller devices without losing functionality. Accordingly, as the computing devices decrease in size and price, so, too, do the digital cameras. However, it can be challenging to decrease in size and price of a digital camera without degrading the quality of the image captures. To improve dynamic range of an image capture, some digital cameras use HDR image sensors, where different exposure settings are applied to various regions of an HDR sensor. In turn, the HDR image sensor multiplexes together the varying results to generate an output image with improved dynamic range.

Figure 5:
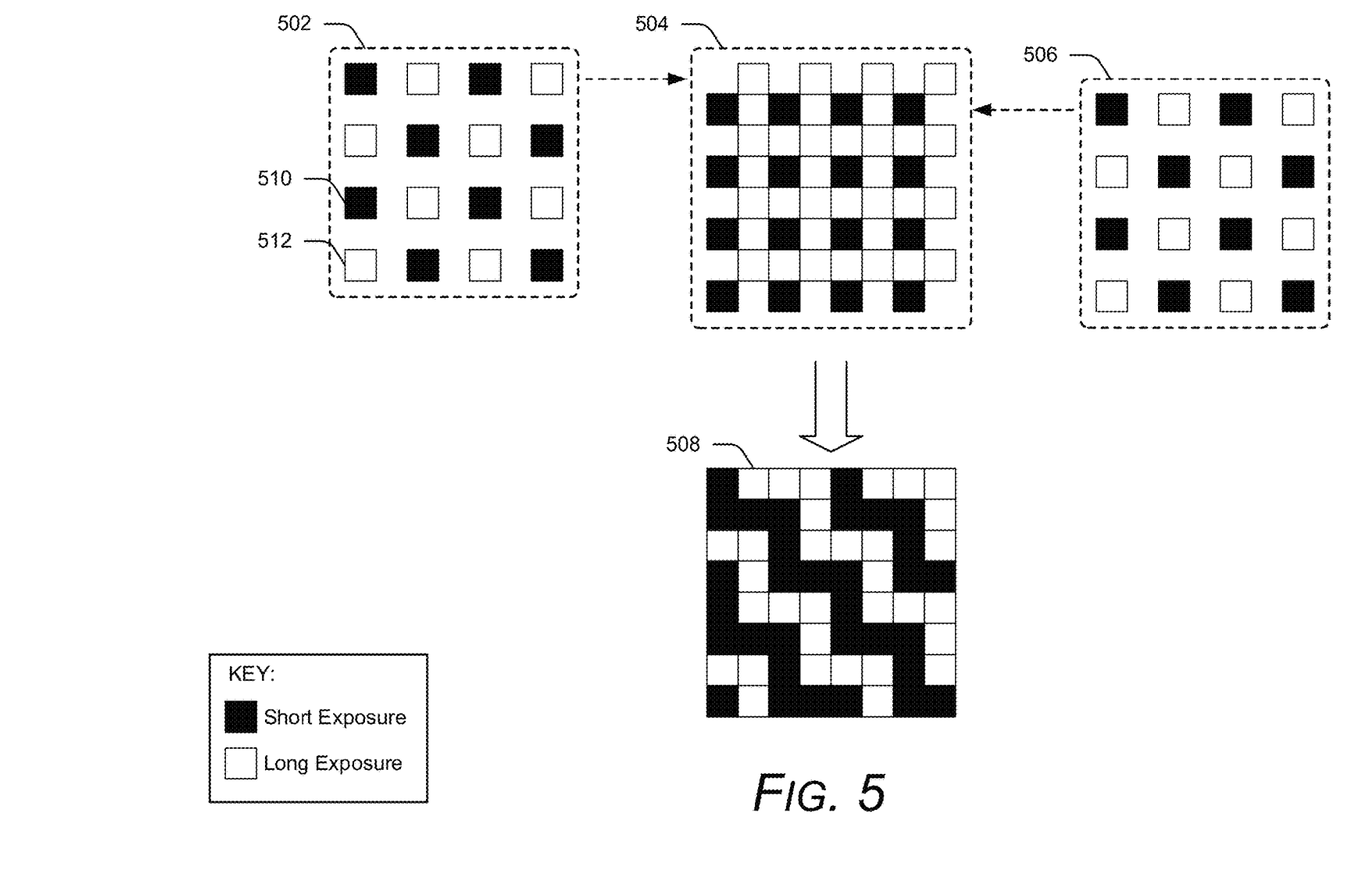
FIG. 5 illustrates an example of exposure patterns applied to an image sensor in accordance with one or more embodiments.

To further illustrate, consider FIG. 5 that includes an example exposure pattern applied to an image sensor in one or more embodiments. In this example, the exposure pattern includes two settings: a short exposure setting and a long exposure setting. However, an exposure pattern can include any other suitable or number of exposure settings of varying levels. For instance, an exposure pattern can include three different short exposure settings, five different long exposure settings, a medium exposure setting, and so forth. However, for discussion purposes, this example will be described in the context of an exposure pattern having short exposure settings and long exposure settings.

Pattern 502 illustrates a grid of 4×4 units, where each unit in the pattern corresponds to an exposure setting of a discrete sensor, or a grouping of sensors, of an image sensor. To illustrate, consider image sensor 106-1 of FIG. 4 that includes sensors 402. For discussion purposes, assume that sensors 402 of image sensor 106-1 are arranged in an 8×8 grid instead of the illustrated 8×9 grid. Since each respective sensor of image sensor 106-1 is independent from the other sensors, they can be set or configured differently. In other words, sensor 402-1 can be configured to use an exposure setting that differs from an exposure setting applied to sensor 402-2, and so forth. Since each respective unit can be configured differently, some embodiments apply specific exposure patterns that improve the dynamic range of a captured image. In this example, a single unit illustrated in pattern 502 corresponds to the exposure settings of a discrete sensor of image sensor 106-1. However, since sensors 402 include a grid of 8×8 units, and pattern 502 includes a grid of 4×4 units, pattern 502 only corresponds to a sub-portion or sub-region of image sensor 106-1. Accordingly, to configure the whole of image sensor 106-1, multiple patterns are interleaved together as further described herein.

To configure a grid of 8×8 units in an image sensor, pattern 504 and pattern 506, which also includes a grid of 4×4 units, are interleaved with pattern 502. In turn, these patterns form a grid of 8×8 units, illustrated here as pattern 508. Returning to the example of image sensor 106-1 having an 8×8 grid of image sensors, each unit of pattern 508 corresponds to a respective discrete sensor of sensors 402, thus configuring exposure settings for the whole of image sensor 106-1. While the correspondence here is described in the context of each unit having a 1:1 correspondence with a discrete sensor, other types of relationship can be utilized as well. For example, each unit in pattern 502 can alternately have a 1:N correspondence (N being an arbitrary number) with multiple discrete sensors, where a unit corresponds to sub-groupings of sensors, such as groups of 2 sensors, groups of 2×2 sensor grids, and so forth.

Pattern 502 includes short exposure unit 510, where the corresponding sensor(s) are configured with short exposure settings, and long exposure unit 512, where the corresponding sensor(s) are configured with long exposure settings. For the whole of pattern 502 (as well as pattern 504, pattern 506, and pattern 508), units configured with short exposure settings are indicated in black, while units configured with long exposure settings are indicated in white. In this example, the first row of pattern 502 and pattern 506 have alternating exposure units (e.g., short exposure unit, long exposure unit, short exposure unit, long exposure unit). Conversely, the first row of pattern 504 uses a same exposure configuration for each unit (e.g., long exposure, long exposure, long exposure, long exposure). When interleaved, these variations form a zig-zag exposure pattern as illustrated in pattern 508, which, when applied to an image sensor, generate an interleaved High Dynamic Range (iHDR) image sensor. However, other exposure patterns can be utilized without departing from the scope of the claimed subject matter. Accordingly, some units have different exposure settings than their adjacent units. In turn, this generates different types of information about a scene in the corresponding region of the image sensor. To improve the dynamic range of an image, some HDR image sensors use similar exposure setting patterns, such as that illustrated in pattern 508, to generate the differing information, and then multiplex or merge the information together.

While applying certain exposure patterns to an image sensor improves the dynamic range of an image, the improvement comes at the cost of the image's resolution. To further illustrate this, consider FIG. 6 that includes two image captures of the same scene. Image 602 illustrates a first image capture of the scene where the corresponding HDR image sensor is turned off during capture. Conversely, image 604 illustrates a second image capture of the scene, but with the HDR sensors turned on. To demonstrate and compare the differences between these captures, two separate excerpts have been extracted and magnified.

Figure 6:
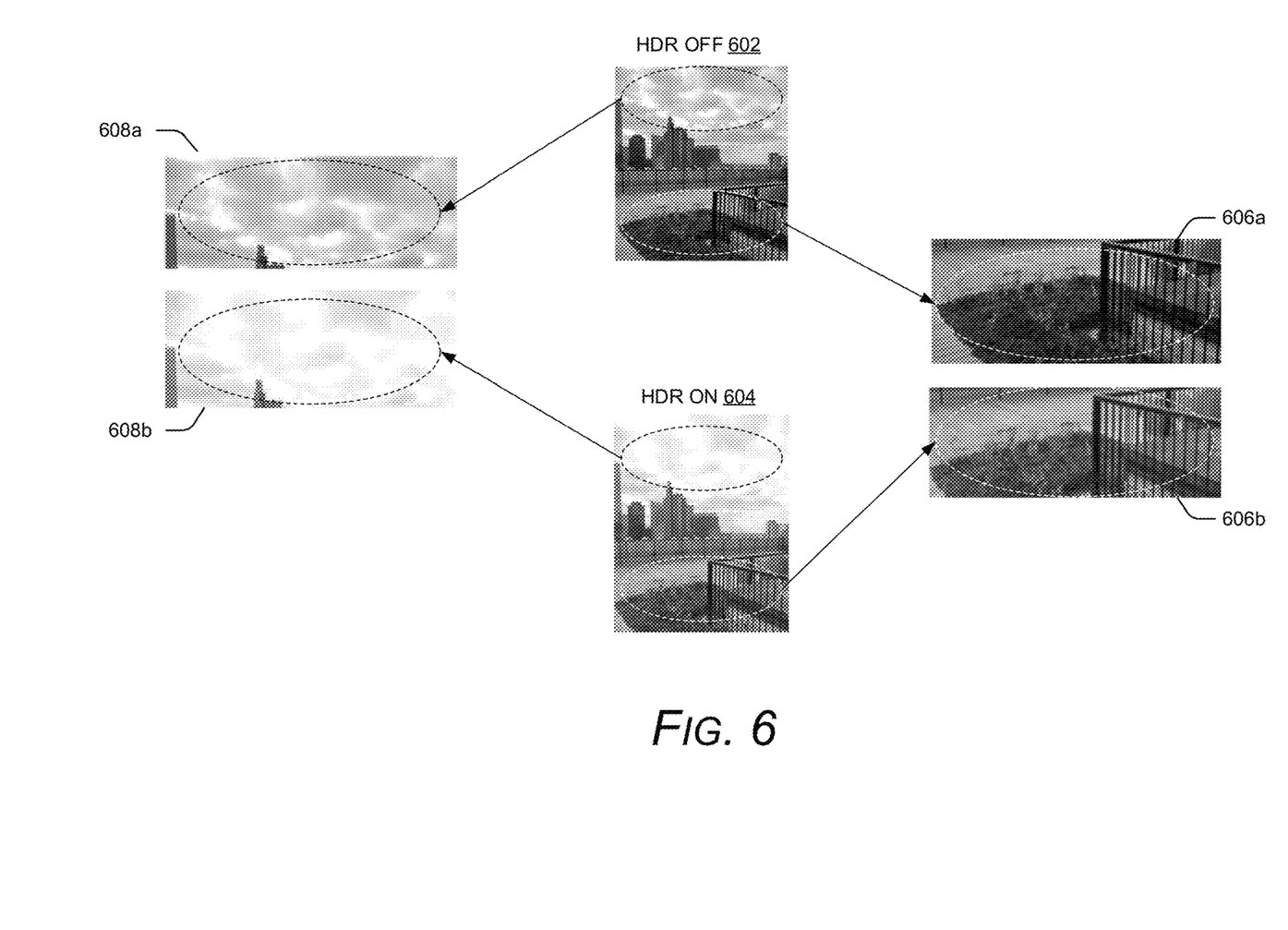
FIG. 6 illustrates example image captures in accordance with one or more embodiments.

Image excerpt 606a corresponds to a magnified view of a flower bed and fence positioned at the bottom of the scene captured in image 602. Similarly, image excerpt 606b corresponds to a magnified view of the same flower bed and fence captured in image 604. As can be seen, image excerpt 606a includes regions that are under-exposed relative to image excerpt 606b. In other words, image excerpt 606a has darker regions that obscure details of various items, such as the ground, flower stems, and so forth. Conversely, the exposure across image excerpt 606b appears more uniform relative to image excerpt 606a. This can be attributed to the increased dynamic range provided by the HDR image sensor configuration in image 604. However, it can additionally be seen that image excerpt 606b has less definition or detail than that of image excerpt 606a. For instance, the flowers of image excerpt 606a are visually cleaner and crisper than the flowers of image excerpt 606b. Thus, while image excerpt 606b has more dynamic range and more uniform exposure than image excerpt 606a, it comes up the price of degrading the resultant detail and/or definition of image 604.

As in other example, image excerpt 608a illustrates a magnified view of clouds in the sky positioned at the top of the scene captured in image 602. As in the case of image excerpt 606a, regions of image excerpt 608a appear under-exposed with darker regions across the clouds than when viewed by the human eye. Conversely, image excerpt to 608b appears to have more uniform exposure relative to image excerpt 606a, which more closely recreates the scene as viewed by the human eye. However, as in the case of image excerpt 606b, as the dynamic range increases, the resolution and/or detail of image excerpt 608b decreases. This can be seen visually by comparing the detail of the clouds in each excerpt, where the clouds have more sharpness and detail in image excerpt 608a relative to image excerpt 608b. Thus, while HDR image sensors can improve and increase the dynamic range in capturing more uniform exposure across an image, it comes at the cost of degrading resolution.

To further illustrate, consider now a scene which includes an indoor room with a window that exposes light from the outside into the room. For discussion purposes, this discussion has been simplified, and is not indented to describe all aspects of image resolution loss. Relative to the inside the room, the window has brighter lighting. Accordingly, the regions including the window are considered to have bright-lighting relative to regions inside the room that have low-lighting. This variation within the scene can be difficult to replicate because of the different exposure needs for each region. For example, to capture a region with low-lighting, an image sensor uses longer exposure times relative to regions with bright-lighting. These long exposure times allow for more light to contact an image sensor and increase the amount of information that can be gather. In turn, these long exposure times improve the ability to replicate regions with low-lighting. However, these longer exposure times lose information for brighter regions by oversaturating the corresponding image sensors. An HDR image sensor improves the dynamic range over an image capture by multiplexing information from both long and short exposure image sensors. However, for various reasons, such as overexposure in bright regions, HDR image sensors lose resolution when fusing the long exposure sensors with the short exposure sensors.

Figure 7:
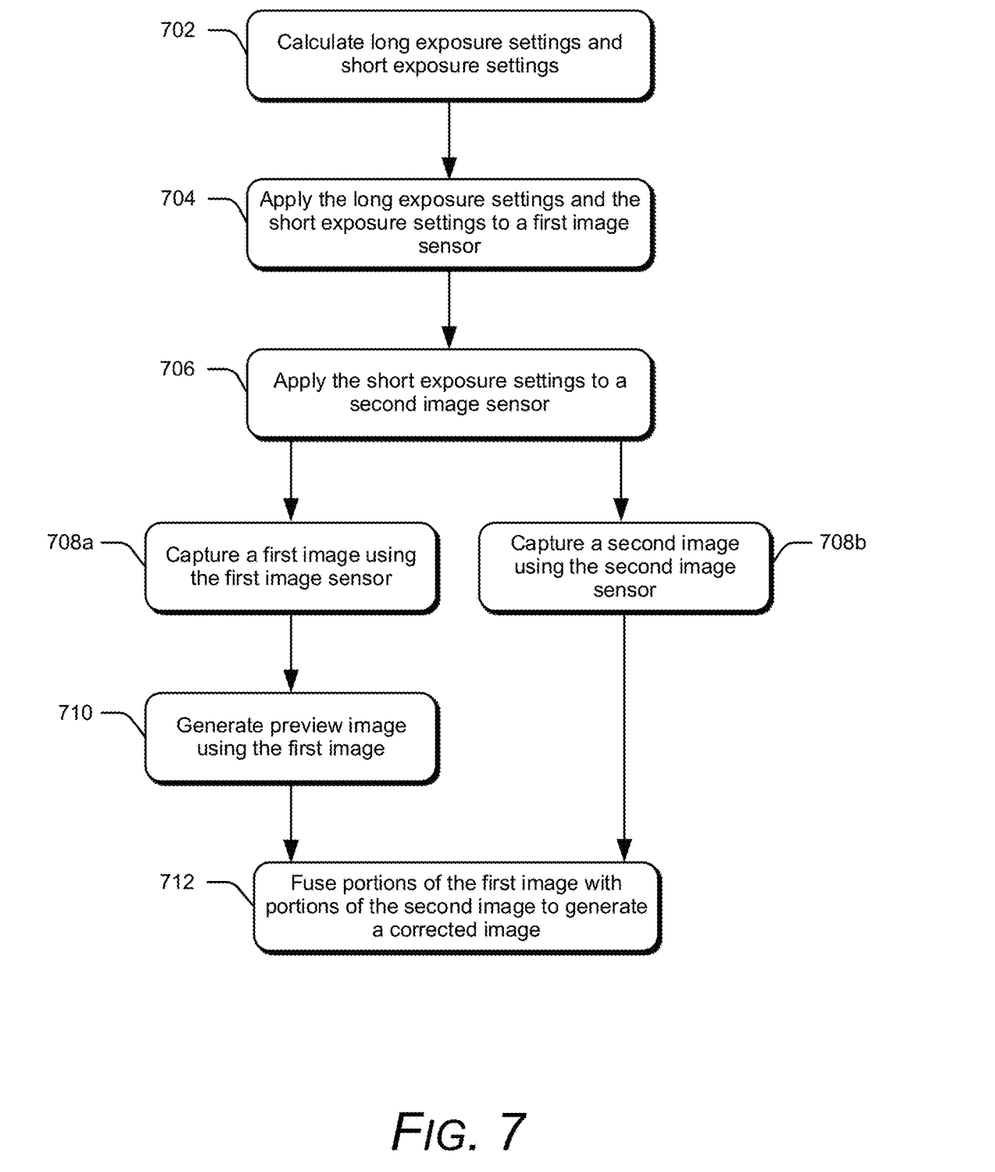
FIG. 7 illustrates a flow diagram in which improved resolution of an image is employed in accordance with one or more embodiments.

Various embodiments provide improved image resolution of an HDR image sensor by using multiple sensors. A computing device first calculates long exposure settings and short exposure settings for the multiple image sensors. The long exposure settings and the short exposure settings are applied to a first image sensor of the multiple image sensors, and only the short exposure settings are applied to a second image sensor of the multiple image sensors. Some embodiments use an HDR image sensor as the first image sensor, and a Clear or Mono image sensor for the second image sensor. Various embodiments generate a synchronized image that includes a first image generated by the first image sensor and a second image generated by the second image sensor. Upon receiving the synchronized image, some embodiments fuse the first image capture and the second image capture to improve the image resolution of the first image capture Consider FIG. 7 that illustrates a method for improving the resolution of an HDR image in accordance with one or more embodiments. The method can be performed by any suitable hardware, software, firmware, or combination thereof. In at least some embodiments, aspects of the method can be implemented by one or more suitably configured hardware components and/or software modules, such as image capture module 104 of FIGS. 1 and 2. While the method described in FIG. 7 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

Step 702 calculates long exposure settings and short exposure settings for image sensors, such as the long exposure settings and the short exposure settings used in an iHDR image sensor. In some embodiments, one of the image sensors is used to perform the calculating and/or provide information used in the calculating. The long exposure settings and/or short exposure settings can be based on any type of information. For example, prior to capturing an image, some embodiments scan a current scene in view of one or more image sensors to identify luminance metric(s) associated with the scene, and then base the long exposure settings and short exposure setting calculations on the luminance metric(s) and/or other information. As an example, the long exposure settings calculated for a scene with high luminance may differ from the long exposure settings calculated for a scene with low luminance. Alternately or additionally, the exposure settings can include graduated levels (e.g., three levels of long exposure settings, four levels of short exposure settings). In some embodiments, when an image sensor is used to calculate the long exposure settings and the short exposure settings, it can be synchronized to a second image sensor to share or baseline the short exposure settings between multiple image sensors. For instance, the two image sensors can be synchronized in hardware share the luminance readout and/or exposure settings.

Responsive to calculating the long exposure settings and short exposure settings, step 704 applies the long exposure settings and the short exposure settings to a first image sensor. Some embodiments apply the exposure settings to an iHDR image sensor with a predetermined exposure pattern or configuration for the exposure settings, such as a zig-zag exposure pattern as further described herein. However, other types of patterns and image sensors can be used as the first image sensor. When the image sensor employs a predetermined exposure pattern, the long exposure settings calculated in step 702 are applied to the corresponding long exposure units in the pattern, and the short exposure settings calculated in step 702 would be applied to the corresponding short exposure units in the pattern.

Step 706 applies to the short exposure settings to a second image sensor. In some embodiments, such as when the first image sensor calculates the long exposure settings and the short exposure settings, the second image sensor synchronizes to the first image sensor to receive or obtain what short exposure settings to apply. This can be achieved in any suitable manner, such as through a hardware synchronization process, a software synchronization process, or any combination thereof. For instance, in the case where the first image sensor and/or the second image sensor is implemented as a Complementary Metal-Oxide-Semiconductor (CMOS) sensor, the integrated circuit can include hardware mechanism and/or protocol handshaking used to transfer exposure setting information, such as the short exposure settings as further described herein. In other embodiments, a software module can calculate exposure settings and store the information in a table. The second image sensor can be any suitable type of image sensor. In some cases, the second image sensor is an auxiliary Clear or Mono sensor, where each captured pixel represents a sensitivity to light and/or shading. While step 706 is illustrated and described separately from step 704, some embodiments concurrently apply the short exposure settings to the second image sensor while applying the long exposure settings and the short exposure settings to the first image sensor.

Step 708a captures a first image using the first image sensor, while step 708b captures a second image using the second image sensor. For instance, the first image sensor can capture an HDR image generated from an iHDR image sensor, where information from each discrete sensor is multiplexed together to generate an image with high dynamic resolution, and the second image sensor can capture a monochrome image using a Clear and/or Mono image sensor. Some embodiments synchronize the image sensors to capture the first image and the second image at generally the same time. Here, the term "generally" is used to indicate that while the first image and the second image may not be captured at exactly the same point in time due to timing delays in hardware, they are effectively captured at the same time in that the image capture module attempts to capture the two images at the same time. To further indicate the synchronized nature between the image captures generated by the image sensors, step 708a and step 708b share a same designator, with a differing sub-character. (e.g., "708a" versus "708b"). As further described herein, various embodiments additionally synchronize the image capture by applying the respective exposure settings to each image sensor concurrently.

Step 710 optionally generates a preview image using the first image. For instance, some embodiments generate an HDR image preview using only the first image without resolution improvement applied as further described herein. In some embodiments, after generating the preview image, the preview image is displayed on a display device associated with a corresponding computing device. Generating the preview image can also include generating a down-sampled HDR image from the first image.

Responsive to generating the first image and the second image, step 712 fuses portions of the first image with portions of the second image to generate a corrected image, such as an HDR image with improved resolution relative to an HDR image without the fusing process. Accordingly, information lost in the first image, such as overexposed regions, can be supplemented using information from the second image. Images can be fused together in any suitable manner. In some embodiments, a point of reference is identified in each image, and then used to align and fuse the images together, such as through the use of a depth map. All or portions of the images can be fuse together. Sometimes the fusion process dynamically selects which image sensor data to use based upon a corresponding luminance as further described herein.

Figure 8:
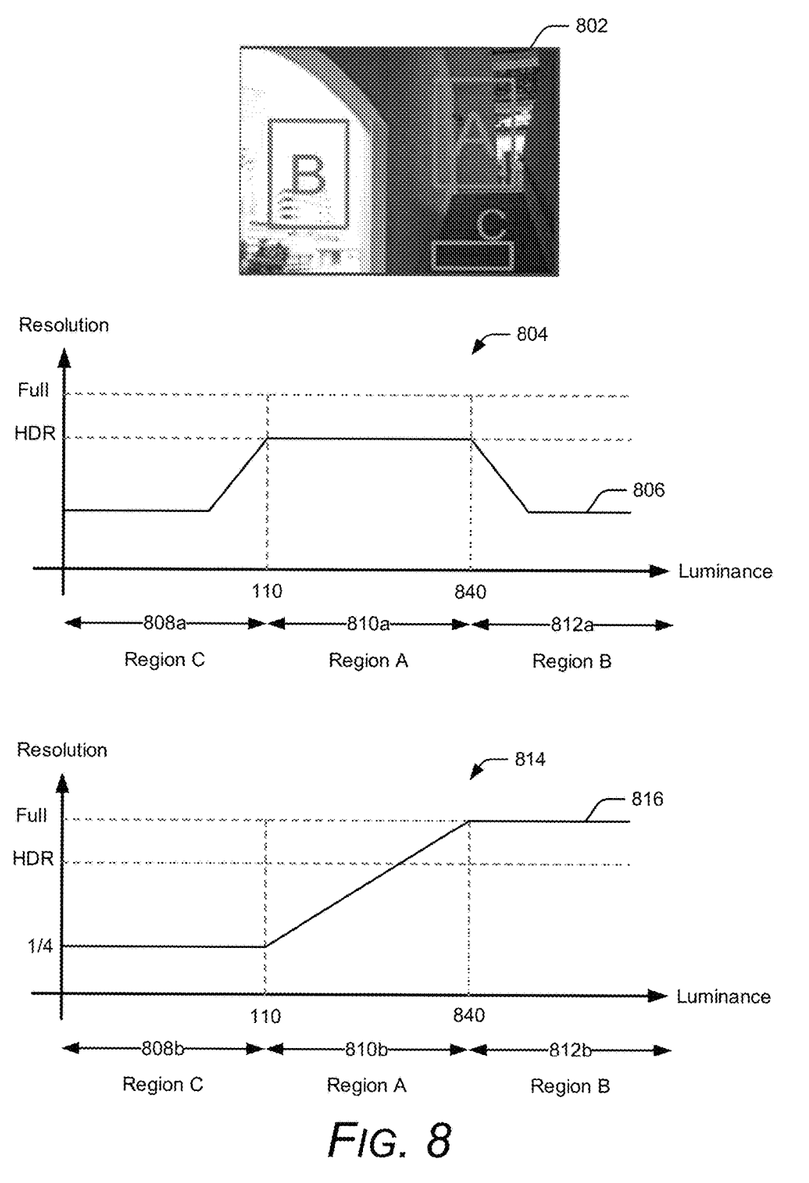
FIG. 8 illustrates resolution versus luminance graphs of various image sensors in accordance with one or more embodiments.

To further illustrate, consider FIG. 8 that incorporates example graphs that plot image resolution relative to the luminance of an image. Image capture 802 of FIG. 8 represents an HDR image capture of a scene (generated by an iHDR image sensor). Here, image capture 802 identifies three separate regions: region A, region B, and region C. Among the three regions, region C has the lowest lighting and/or luminance, region B has the brightest lighting and/or luminance, and region A has luminance that falls in between the luminance of region B and region C. Since image capture 802 represents an HDR image, the corresponding exposure settings generate an image with more uniform exposure over the whole range of luminance. Because of this, image capture more optimally captures region A relative to region B and region C in lighting and resolution as further described herein. Thus, region C appears under-exposed relative to region A, and region B appears over-exposed relative to region A. Since the corresponding exposure settings are less optimal for regions B and C, the exposure settings lose information in the over-exposed and under-expose regions (e.g., region B and region C) and results in regions with lesser resolution relative to region A.

Graph 804 further illustrates this by charting luminance versus resolution properties of image capture 802 via graph line 806. The vertical axis of graph 804 corresponds to resolution, while the horizontal axis corresponds to luminance and/or input brightness. The horizontal axis of graph 804 includes three partitions of luminance: partition 808a, partition 810a, and partition 812a, each of which can have any arbitrary length and/or luminance boundaries. In this example, the scale luminance ranges from 0 to 1024, where 0 represents the lowest brightness possible in the scale (e.g., darkest) and 1024 represents the highest brightness possible for the scale. Thus, partition 808a is associated with image resolution over a luminance range of 0 to 110, partition 810a is associated with image resolution over a luminance range of 111 to 840, and partition 812a is associated with image resolution over a luminance range of 841 to 1024. Graph 804 also includes two lines on the vertical axis that mark points of interest in image resolution: full resolution and HDR resolution. Full resolution indicates the best possible resolution for an image capture, while HDR resolution indicates the best possible resolution for an HDR image. As can be observed, the HDR resolution is less than full resolution, which is attributable to the spatial sampling system used to generate an HDR image.

Since partition 808a spans the lowest range of luminance (e.g., 0 to 110), it corresponds to region C of image capture 802. Within this partition, the units of the iHDR image sensor with short-exposure settings are not exposed to light long enough to optimally capture information. Accordingly, the iHDR image sensor only uses information from the units with long exposure settings to generate image capture 802, resulting in an image resolution over region C that less than full resolution and iHDR resolution. In a similar manner, partition 812a spans the highest range of luminance (e.g., 841 to 1024) and corresponds to region B of image capture 802. Here, the units of the iHDR image sensor with long exposure settings become over-saturated due to the bright lighting, and lose information. Thus, over regions of bright luminance, the iHDR image sensor only uses information from units with short exposure settings to generate image capture 802, resulting in an image resolution over region B that is also less than full resolution and HDR resolution. Conversely, partition 810a spans a range of luminance that resides in-between (e.g., 111 to 840) and corresponds to region A of image capture 802. Here, the iHDR image sensor multiplexes information from units with both long exposure settings and short exposure settings to generate the resultant image since each setting captures some form of information. Accordingly, this results in a resolution for region A that achieves HDR image resolution. However, region A only represents a portion of image capture 802, and not the image as a whole. To improve an overall image quality, it is desirable to improve image resolution for the other regions (e.g., region B and region C). Accordingly, various embodiments dynamically select and fuse portions of a second image capture generated by a second image sensor with the first image as further described herein.

Graph 814 illustrates luminance versus resolution properties of a second image capture (of the same scene captured by image capture 802) generated by a second image sensor, such as a Clear or Mono image sensor, that is synchronized with the first image sensor. As in the case of graph 804, the vertical axis of graph 814 corresponds to resolution and includes lines to mark full resolution and HDR resolution. Similarly, the horizontal axis corresponds to luminance, and uses three partitions to represent the same ranges of luminance used in graph 804 (e.g., 0 to 1024): partition 808b, partition 810b, and partition 812b. It can be noted that partition 808b, partition 810b, and partition 812b have the same luminance boundaries as partition 808a, partition 810a, and partition 812a respectively. Finally, similar to graph line 806, graph line 816 charts the image resolution versus image luminance of the second image capture.

Recall now that some embodiments configure the second image capture with short exposure settings only. In view of this, the discrete sensors or units used to capture low-light regions within the image, such as region C in partition 808b, are not exposed to enough light to capture these regions at full resolution. Accordingly, the image resolution over the luminance represented in partition 808b falls below full resolution and HDR resolution. Now recall that the iHDR image sensor only uses information from units with long exposure settings over regions of low luminance to generate an output image. Some embodiments dynamically fuse together information from the second image capture (captured via units with short exposure settings) over regions of low luminance with the corresponding regions captured by the first image sensor to improve the contrast and avoid darkness. Thus, in this example, the fusion process dynamically selects to fuse ¼ the short exposure information and/or pixels over partition 808a/partition 808b to improve image resolution over region C (e.g., portions of the image that fall within the luminance range of 0 to 110) in the output image capture. Alternately or additionally, the fusion process weights the information generated by the second image sensor lower than information generated by the first image sensor over regions of low luminance (e.g., a weighting of ¼). While illustrated as using ¼ the information, it is to be appreciated that the selection process can use other weightings without departing from the scope of the claimed subject matter.

Now consider partition 812b which represents regions of bright luminance over an image capture. As illustrated by graph line 816, the image resolution provided by the second image sensor reaches full resolution since the second image sensor uses short exposure settings only. Thus, the second image sensor provides better image resolution for bright-light environments relative to the image resolution provided by the first image sensor (e.g., the iHDR image sensor). Accordingly, in some embodiments, the fusion process dynamically fuses all of the information provided by the second image sensor with the image captured by the first image sensor, such as over regions of bright luminance. In other words, the fusion process weights the information generated by the second image sensor at full weight over regions of bright luminance.

Turning to partition 810b, recall its luminance spans a range in-between the low-light luminance of region C and the bright-light luminance of region B. Accordingly, the short exposure units and the long exposure units each contribute information to the resultant output image of the first image sensor. In this region, the fusion process can interpolate how much information to fuse from the second image sensor with the first image sensor. Here, graph line 816 illustrates a ramp that starts by using ¼ the information at the lower boundary of the region (e.g., 110), and gradually increases to full resolution as luminance becomes brighter (e.g., 840). The fusion process can interpolate how to fuse information in any suitable manner. For instance, the fusion process may select information from the second image sensor at points of luminance that have a resolution that exceeds, or is located at, the HDR resolution provided by the first image sensor. Alternately or additionally, the fusion process may select information from the first image sensor at points of luminance that have an image resolution that is greater than image resolution provided by the second image sensor. Thus, some embodiments selectively blend information from the first image sensor and the second image sensor over a particular region and/or range of luminance to generate an output image.

By using synchronized image sensors, various embodiments improve the resolution of an output image capture relative to an image capture generated by a single image sensor. For example, with respect to FIG. 8, the output image resulting from merging an HDR image with a second image sensor image improves the output image resolution for regions ranging from mid- to bright-lighting (e.g., partition 810a/810b, partition 812a/812b). In turn, the fusion process results in an output image with the advantage of high dynamic range in luminance (as produced by an iHDR image sensor) coupled with improved resolution (provided by a second image sensor). This allows for an image with the benefits provided by an iHDR image sensor (e.g., no motion blur, a preview with HDR, 1-frame generation of an HDR image) with improved resolution loss over regions of low and bright luminance by using information from a synchronized second image sensor.

Having considered a discussion image fusion to improve the resolution of an HDR image, consider now a discussion of an example device that can include resolution improvement techniques in accordance with various embodiments described herein.

Example Device

Figure 9:
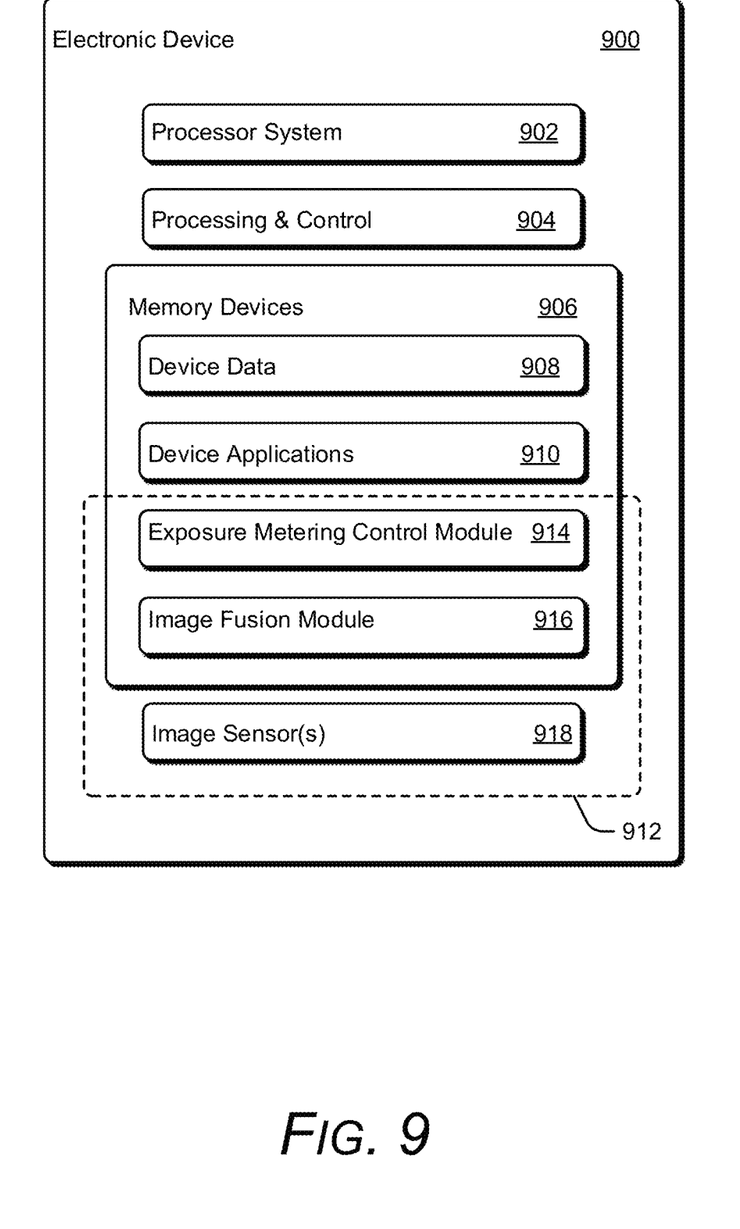
FIG. 9 is an illustration of an example device in accordance with one or more embodiments.

FIG. 9 illustrates various components of an example electronic device 900 that can be utilized to implement the embodiments described herein. Electronic device 900 can be, or include, many different types of devices capable of implementing improved HDR image resolution through synchronized image sensors, such as image capture module 104 of FIG. 1.

Electronic device 900 includes processor system 902 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternately or in addition, the electronic device can be implemented with any one or combination of software, hardware, firmware, or fixed-logic circuitry that is implemented in connection with processing and control circuits, which are generally identified as processing and control 904. Although not shown, electronic device 900 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 900 also includes one or more memory devices 906 that enable data storage, examples of which include random access memory (RAM), non-volatile memory (e.g., read-only memory (ROM), flash memory, EPROM, EEPROM, etc.), and a disk storage device. Memory devices 906 are implemented at least in part as a physical device that stores information (e.g., digital or analog values) in storage media, which does not include propagating signals or waveforms. The storage media may be implemented as any suitable types of media such as electronic, magnetic, optic, mechanical, quantum, atomic, and so on. Memory devices 906 provide data storage mechanisms to store the device data 908 and other types of information or data. In some embodiments, device data 908 includes digital images. Memory devices 906 also provide storage for various device applications 910 that can be maintained as software instructions within memory devices 906 and executed by processor system 902.

To facilitate improved HDR image resolution, electronic device 900 includes image capture module 912. Here, portions of image capture module 912 reside on memory devices 906: exposure metering control module 914 and image fusion module 916, while other portions are implement in hardware: image sensors 918. While implemented here as residing on memory devices 906, alternate embodiments implement exposure metering control module 914 and/or image fusion module 916 using varying combinations of firmware, software, and/or hardware. For example, in some embodiments, portions or all of exposure metering control module 914 can be implemented via one of image sensors 918.

Among other things, exposure metering control module 914 represents functionality that calculates and adjusts exposure metering associated with image sensors 918. For example, exposure metering control module 914 calculates long exposure settings and short exposure settings used to adjust image sensors 918. In some embodiments, exposure metering control module 914 bases the calculations upon a current scene in view of one or more of the image sensors 918. Adjusting the exposure metering of the image sensors 918 can include using long exposure settings and short exposure settings for a first image sensor of image sensors 918 and only short exposure settings for a second image sensor of image sensors 918.

Image fusion module 916 represents functionality that generates an output digital image by fusing together information from different captured information. In some embodiments, image fusion module 916 receives synchronized images from image sensors 918, and uses information from each to generate an improved image, such as an image with improved resolution.

Image sensor(s) 918 represent functionality that digitally captures scenes. In some embodiments, each image sensor included in electronic device 900 captures information about a scene that is different from the other image sensors, as further described herein. For example, a first image sensor can capture an HDR image using an HDR image sensor, and a second image sensor can capture clear images using a Clear or Mono sensor. The sensors can be individual sensors that generate an image capture, or include multiple smaller sensors that work in concert to generate an image capture.

It is to be appreciated that while electronic device 900 includes distinct components, this is merely for illustrative purposes, and is not intended to be limiting. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A computing device comprising:
   an interleaved high dynamic range (iHDR) image sensor for capturing images;
   a second image sensor for capturing images to be synchronized with images captured by the iHDR image sensor;
   one or more processors; and
   one or more computer-readable storage devices embodying processor-executable instructions which, responsive to execution by the one or more processors, work in concert with the iHDR image sensor and the second image sensor to enable the computing device to perform operations comprising:
   calculating long exposure settings and short exposure settings for a synchronized image comprising a first image captured via the iHDR image sensor and a second image captured via the second image sensor;
   applying the long exposure settings and the short exposure settings to the iHDR image sensor;
   concurrently applying only the short exposure settings to the second image sensor while applying the long exposure settings and the short exposure settings to the iHDR image sensor;
   capturing the first image using the iHDR image sensor;
   capturing the second image using the second image sensor; and
   fusing the first image with the second image to generate an output image.

2. The computing device as recited in claim 1, wherein the operations further comprise:
   generating a preview image based upon only the first image; and
   displaying the preview image on a display device of the computing device.

3. The computing device as recited in claim 1, wherein the second image sensor comprises a mono image sensor.

4. The computing device as recited in claim 1, wherein the fusing further comprises selectively fusing portions of the first image and portions of the second image based upon luminance.

5. The computing device as recited in claim 4, wherein the selectively fusing portions of the first image and portions of the second image further comprises:
   partitioning a range of luminance into three partitions;
   weighting information from the second image lower than information from the first image over regions of low luminance that correspond to a first partition of the three partitions;
   weighting information from the second image at full weight over regions with bright luminance that correspond to a second partition of the three partitions; and
   interpolating the weighting for information from the second image over regions in-between the regions of low luminance and the regions with bright luminance that corresponds to a third partition of the three partitions.

6. The computing device as recited in claim 1, wherein the calculating the long exposure settings and the short exposure settings further comprises:
   using the iHDR image sensor to calculate the long exposure settings and the short exposure settings; and
   synchronizing the iHDR image sensor with the second image sensor to transfer the short exposure settings to the second image sensor.

7. The computing device as recited in claim 6, wherein synchronizing the iHDR image sensor with the second image sensor to transfer the short exposure settings to the second image sensor further comprises synchronizing the iHDR image sensor with the second image sensor using a hardware synchronization process.

8. The computing device as recited in claim 1, wherein the calculating the long exposure settings and the short exposure settings further comprises using information associated with a current scene in view of the iHDR image sensor or the second image sensor in the calculating.

9. A method comprising:
   calculating long exposure settings and short exposure settings using a first image sensor;
   synchronizing the first image sensor with a second image sensor to share the short exposure settings;
   applying the long exposure settings and the short exposure settings to the first image sensor;
   concurrently applying only the short exposure settings to the second image sensor while applying the long exposure settings and the short exposure settings to the first image sensor;
   capturing a synchronized image using the first image sensor and the second image sensor; and
   selectively fusing a first image of the synchronized image together with a second image of the synchronized image to generate an output image.

10. The method as recited in claim 9, wherein the synchronizing the first image sensor with the second image sensor further comprises synchronizing the first image sensor and the second image using a hardware synchronization process.

11. The method as recited in claim 9, wherein the applying the long exposure settings and the short exposure settings to the first image sensor further comprises using a
predetermined exposure pattern to apply the long exposure settings and the short exposure settings.

12. The method as recited in claim 11, wherein the using the predetermined exposure pattern further comprises using a zig-zag exposure pattern.

13. The method as recited in claim 9, wherein the selectively fusing the first image together with the second image further comprises:
partitioning a range of luminance into three partitions;
weighting information from the second image lower than information from the first image over regions of low luminance that correspond to a first partition of the three partitions;
weighting information from the second image at full weight over regions with bright luminance that correspond to a second partition of the three partitions; and
interpolating the weighting for information from the second image over regions in-between the regions of low luminance and the regions with bright luminance that corresponds to a third partition of the three partitions.

14. The method as recited in claim 13, wherein the first partition, the second partition, and the third partition are based upon luminance boundaries.

15. The method as recited in claim 9, wherein the first image comprises a high dynamic range (HDR) image.

16. The method as recited in claim 9 further comprising:
generating a preview image based upon only the first image by down-sampling the first image; and
displaying the preview image on a display device.

17. An image capture device comprising:
a first image sensor to capture a first image of a scene using long exposure settings and short exposure settings;
a second image sensor synchronized with the first image sensor to capture a second image of the scene using only the short exposure settings;
an exposure metering control module implemented, at least in part, in hardware to:
calculate the long exposure settings and the short exposure settings used by the first image sensor and the second image sensor; and
concurrently apply the long exposure settings and the short exposure settings to the first image sensor, and only the short exposure settings to the second image sensor; and
an image fusion module implemented, at least in part, in hardware to selectively fuse the first image with the second image to generate an output image.

18. The image capture device as recited in claim 17, wherein:
the first image sensor comprises an interleaved high dynamic range (iHDR) image sensor;
the second image sensor comprises a mono image sensor;
the first image comprises a high dynamic range (HDR) image; and
the second image comprises a greyscale image.

19. The image capture device as recited in claim 17, wherein to calculate the long exposure settings and the short exposure settings, the exposure metering control module is configured to:
identify one or more luminance metrics of a current scene using the first image sensor; and
base the long exposure settings or the short exposure settings, at least in part, on the one or more luminance metrics.

20. The image capture device as recited in claim 17, wherein to selectively fuse the first image with the second image, the image fusion module is configured to:
dynamically select and weight information from the second image based upon luminance; and
fuse the dynamically selected and weighted information with the first image.

* * * * *